Oct. 6, 1931.  E. A. MASTICK  1,826,082
ROOFING TILE
Filed Dec. 31, 1927   3 Sheets-Sheet 1
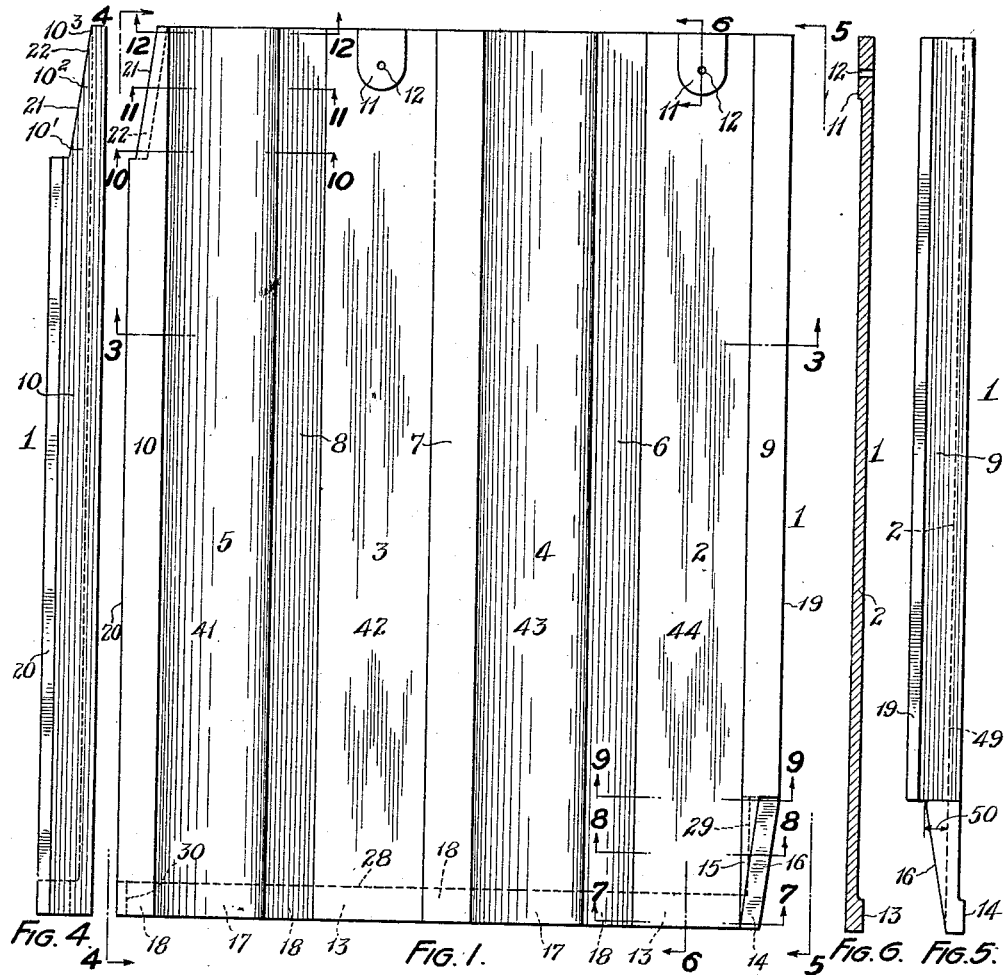
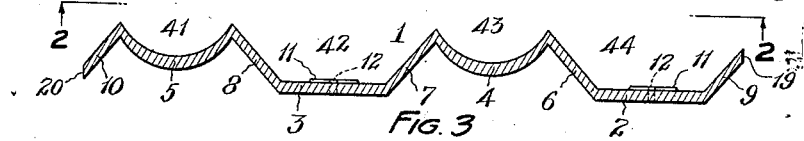
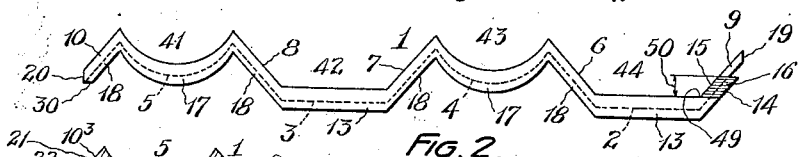
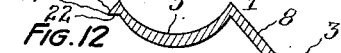
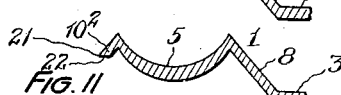
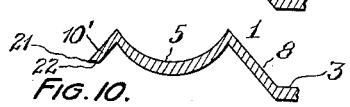
INVENTOR:
EDWIN A. MASTICK
BY George W. Saywell
ATTORNEY.

Oct. 6, 1931. E. A. MASTICK 1,826,082
ROOFING TILE
Filed Dec. 31, 1927 3 Sheets-Sheet 2
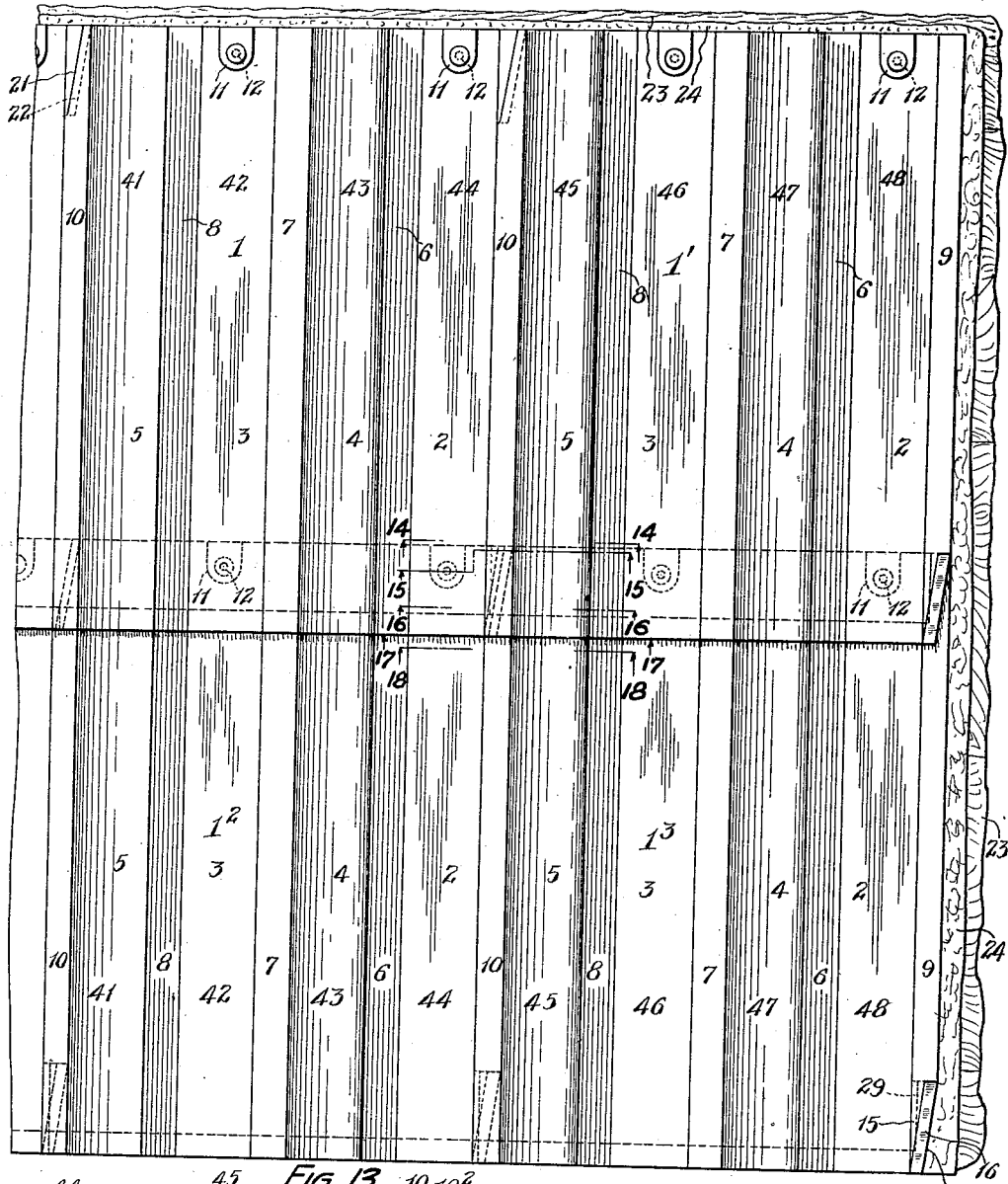

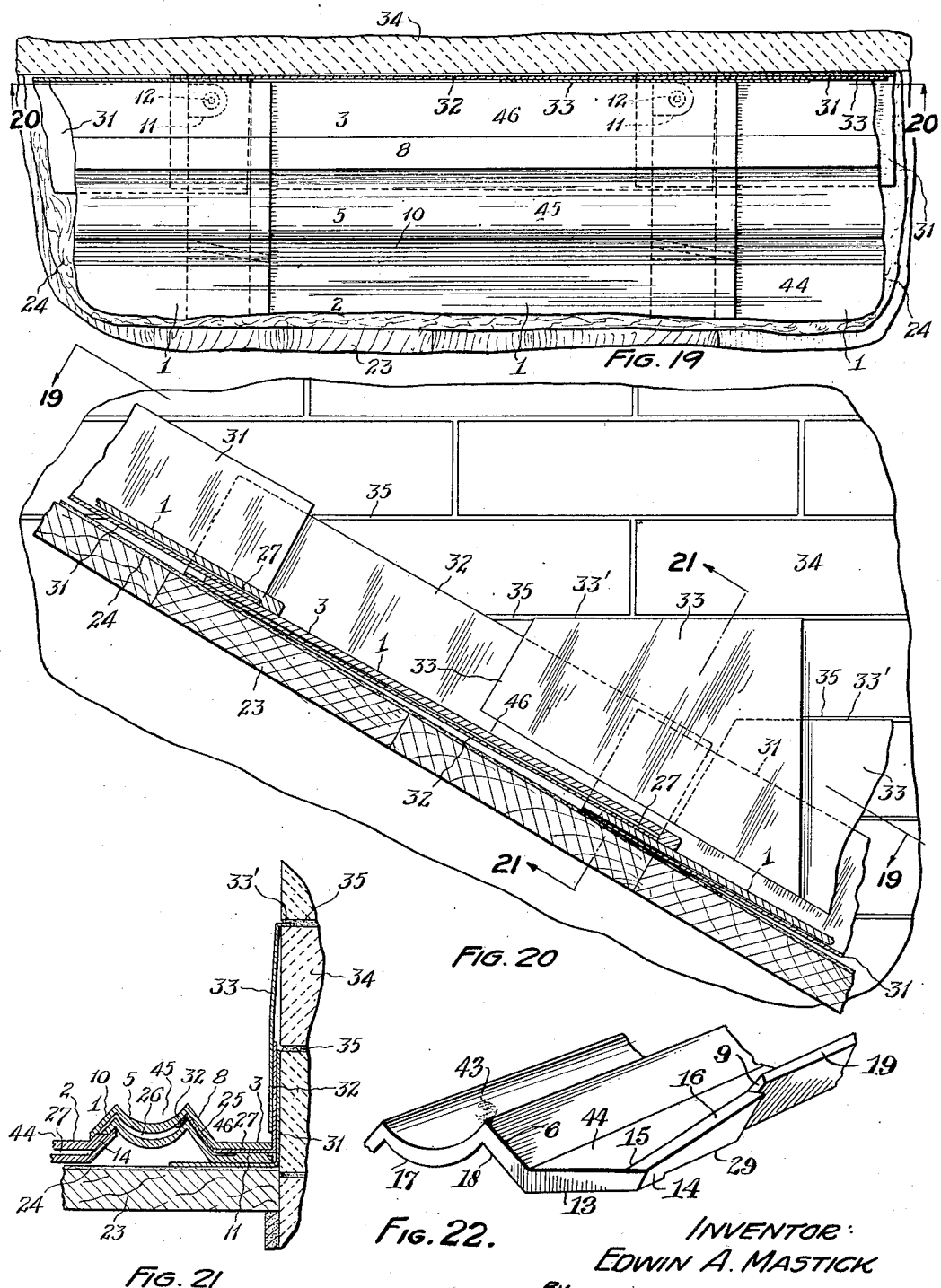

Patented Oct. 6, 1931

1,826,082

UNITED STATES PATENT OFFICE

EDWIN A. MASTICK, OF ROCKY RIVER, OHIO

ROOFING TILE

Application filed December 31, 1927. Serial No. 243,862.

The invention particularly relates to improvements in a roofing tile which is molded from a composition of materials, the composition utilized being any one which is suitable for the purpose, insofar as this application is concerned. The purposes of the invention are to design a roofing tile which will divert water away from the joint area; which will weigh considerably less than clay or cement tiles and will favorably compare with clay or cement tiles in appearance; which will favorably compare in weight with metal tiles; which can be applied with a saving in labor compared with the application of clay or cement tiles; which imposes a less weight upon the roof and therefore permits the use of lighter supporting rafters than clay or cement tiles; which can be nailed directly to the roof boards over a saturated felt foundation without the necessity of using wood strips; and which can be made in solid colors. Other advantages will appear in the following description and upon reference to the accompanying drawings.

The annexed drawings and the following description set forth in detail certain means embodying my invention, such disclosed means, however, constituting but one of the various forms in which the principle of the invention may be illustrated.

In said annexed drawings:

Figure 1 is a plan view of one unit of my improved tile;

Figure 2 is an end elevation, taken from the plane indicated by the line 2—2, Figure 1;

Figure 3 is a transverse vertical section, taken in the plane indicated by the line 3—3, Figure 1;

Figure 4 is a side-edge elevation, taken from the plane indicated by the line 4—4, Figure 1;

Figure 5 is an elevation of the opposite side-edge, taken from the plane indicated by the line 5—5, Figure 1;

Figure 6 is a vertical longitudinal section, taken in the plane indicated by the line 6—6, Figure 1;

Figures 7, 8 and 9 are fragmentary, transverse vertical sections, taken, respectively, in the planes indicated by the lines 7—7, 8—8, and 9—9, Figure 1, these sections showing the interlocking corner of a tile unit which is adapted to be placed under an upper interlocking corner of the next adjacent lower and diagonal tile;

Figures 10, 11 and 12 are fragmentary, transverse vertical sections, taken in the planes indicated, respectively, by the lines 10—10, 11—11, and 12—12, Figure 1, these sections being taken through an upper interlocking corner which is adapted to engage and be placed above the complementary interlocking corner of a tile unit positioned next adjacently above and diagonal thereto;

Figure 13 is a plan section of a part of a roof, showing four of my improved tile units overlapping and interlocked together, this view being upon a somewhat smaller scale than Figure 1;

Figures 14, 15, 16, 17 and 18 are fragmentary, transverse vertical sections, taken, respectively, in the planes indicated by the lines 14—14, 15—15, 16—16, 17—17, and 18—18, Figure 13;

Figure 19 is a fragmentary plan view of a roof provided with my improved tiles at the point where the tiles cooperate with flashing secured to or abutting a vertical wall, this view being taken from the plane indicated by line 19—19, Figure 20;

Figure 20 is a vertical section through the roof shown in Figure 19, this section being taken in the plane indicated by the line 20—20, Figure 19;

Figure 21 is a transverse vertical section, taken in the plane indicated by the line 21—21, Figure 20; and Figure 22 is a perspective view of the lower right hand corner of my tile.

Referring to the annexed drawings in which the same parts are indicated by the same respective ordinals in the several views, a tile unit 1, Figures 1, 2 and 3 is formed of several connected portions, comprising base portions 2 and 3, upper downwardly concave portions 4 and 5, intermediate inclined connecting portions 6, 7 and 8, and outwardly inclined portions 9 and 10, of which one end portion 9 extends upwardly and the other end portion 10 extends downwardly. Thus the tile comprises depressed portions extending longitudinally of the tile and consisting of two downwardly concave portions 41 and 43, and two trough portions 42 and 44, of which the one side 9 of portion 44 forms one edge of the tile. Concave portions 41 and 43 are more shallow than alternate trough portions 42 and 44. The sectional view of the tile shown in Figure 3 is the simplest form or section of my improved unit, being a section taken intermediately of the unit ends, sections through the ends being somewhat more complicated and containing additional features, as plainly appears in Figure 2 and in the sections shown in Figures 7, 8, 9, 10, 11 and 12. Tiles which are laid in the same transverse planes, that is in courses, are interlocked with the next adjacent tiles by means of fitting the end portion 10 of one tile to an end portion 9 of the next adjacent tile, as plainly shown in Figure 14, the portion 10 overlying the portion 9. How the tiles are interlocked in vertical planes or rows will be hereinafter fully described.

I strengthen the bottom end of the tile unit 1 for various reasons, including the purpose of appearance in that it makes the tile look thick and substantial, for the purpose of making it stronger at the exposed edge and thus preventing distortion and breakage, and for the purpose of increasing the shadow lines. This reinforcement or strengthening means at the bottom edge comprises portions 13 secured to the base portions 2 and 3, a portion 14 secured to the outwardly projecting end portion 9, portions 17 secured to the upper concave portions 4 and 5, and portions 18 secured to the inclined portions 6, 7, 8 and 10. This reinforcement consists of one integral portion formed with the normal tile section but I have given different sections of the reinforcement different numbers for the purpose of more definitely referring to them hereinafter. The reinforcement portion 14 is of unique construction, being inclined upwardly and outwardly from the end of the unit 1, as plainly shown in Figure 2 by the bevel 15 and in Figure 5 by the bevel 16. The construction also is shown in the plan view, Figure 1. The lateral face of the upper portion of the side-edge 9 of the unit 1 commencing adjacent the inner end of the inclined portion 14 and running the full length of the unit is indicated by the ordinal 19. The lateral face of the lower portion of the opposite side-edge 10 of the unit is indicated by the ordinal 20.

It will be recalled that the lower right-hand corner of the unit, as it appears in Figure 1, is intended to lie under the upper left-hand corner of the unit next adjacently lower, i. e., the diagonally lower right-hand unit. The construction of this upper left-hand corner will now be described in detail, by reference to Figures 1, 4, 10, 11 and 12. This corner of the unit is also beveled and the bevel extends outwardly and downwardly from the top end of the unit, the beveled surface being shown at 22 in Figures 1, 4, 10, 11 and 12, and the edge of this surface being indicated by ordinal 21 in these figures. This provides an end member complementary to the bottom right-hand corner of the unit diagonally adjacently above so that these corners and consequently the units can be interlocked. Also, consequently, the downwardly-inclined end member 10 is gradually shortened as it approaches the extreme upper end of the unit, as appears by the elements $10'$, $10^2$ and $10^3$, Figures 10, 11 and 12. The units are designed to be secured at the top to the roof boards 23 by means of nail holes 12 formed in unit reinforcement sections 11, as shown in Figure 13, a layer of roofing felt 24 being positioned immediately beneath the tile units and intermediately the latter and the roof boards 23.

Referring particularly to Figures 13-18, I show four interlocked units designated by the ordinals 1, $1'$, $1^2$ and $1^3$, of which 1 and $1'$ are side by side upper units and $1^2$ and $1^3$ are side by side next adjacently lower units. The lap of the upper and lower units is substantially the length of the interlocking corner portions, the lapping edge at the upper corner of a unit overlying the lapping edge at the lower corner of the complementary unit. The sections 14, 15, 16, 17 and 18 are taken adjacent to or through this lapped portion and plainly show the relative positions of the lapped unit portions in different sections. Referring particularly to Figure 14, which is taken just above the upper edge of the lap, it will be noted that the construction is simply the normal lapping of the side portion 10 of the unit $1'$ upon the side portion 9 of the unit 1. Referring to Figure 15, which is the section just adjacently within the upper edge of the lap (part of the section being taken through the unit-attaching means), it will be noted that the section of the unit 1 corresponds to the section shown in Figure 9 and, inasmuch as the section of unit $1'$ is a section taken adjacent the left-hand lower corner of a unit, such as shown in Figure 1, and yet interiorly of the inner edge of the reinforcement 17 and 18, that consequently the section of unit $1'$ in Figure 15 appears the same as it does in Figure 14. Figure 16 shows a section also taken interiorly of the reinforcement 17 and 18 of the bottom edge of the unit $1'$ so that the unit $1'$ in this figure also appears the same as it does in Figures 14 and 15. However, in Figure 16, the section through unit 1 is substantially the same as that shown in Figure 8. Referring particularly to Figure 17, which is a section taken through the reinforcement at the bottom edge of both units 1 and $1'$, the section of unit 1 appears substantially as it appears in Figure 7 and the section of the unit 1' is similar to a transverse section of the left-hand portion of Figure 2. Referring now to the units shown in Figures 15, 16 and 17, whose lapping edges respectively underlie the units 1 and 1', such units are indicated by the ordinals $1^2$ and $1^3$. It will be noted that in Figure 15 the section of unit $1^2$ is through the securing tab 11 and that the end enlargement 14 of the unit 1 abuts the outer inclined portion 9 of the unit $1^2$, this particular part of the sections of the units 1' and $1^2$ being taken somewhat higher than the attaching nails, as appears by the section line 15—15, Figure 13. The unit $1^3$ which underlies the unit 1' in Figure 15 appears about as in the section of Figure 12. In Figure 16 the unit $1^2$ appears substantially as the right-hand end of Figure 3 and the unit $1^3$ appears substantially as the section of Figure 11. In Figure 17 the unit $1^2$ is unchanged from the showing of Figure 16 and the unit $1^3$ appears substantially as shown in Figure 10. A difference in the showing of Figure 17 over Figure 16 also appears because of the fact that the section 17 is taken through the bottom thickened end edge of units 1 and 1' which results in the elimination of the spaces 25, 26 and 27, of Figure 16 between the units 1' and $1^3$ and the units 1 and $1^2$, respectively, caused by the lifting of the upper units above the lower units by the thickened bottom edges formed upon the overlying units. The section and elevation shown in Figure 18 will be perfectly plain, it being evident that it is an elevation of units 1 and 1' corresponding to the right and left hand ends respectively of Figure 2 and a section of units $1^2$ and $1^3$ corresponding to the sections of units 1 and 1' shown in Figure 14, the thickened member 14 of the unit 1 not appearing, however, inasmuch as it lies behind the edge 10. In this Figure 18 the spaces 25, 26 and 27 appear in dotted lines because the thickened lower edge of the units 1 and 1' fit down closely upon the adjacent end portions of the units $1^2$ and $1^3$. This provides a weather and moistureproof exposed edge. Dotted lines 28, 30 and 29 of Figure 1 indicate the direction and extent of the reinforcement at the bottom of the unit, the shoulder for the abutting edge of pad 14, and the inner longitudinal bottom edge of 14, respectively.

From the foregoing description, and upon reference to the accompanying drawings, it will be noted that the right-hand lower corner of a unit is fitted in under the cooperating locking element at the upper left-hand corner of a unit diagonally and adjacently below the first unit, the lower lapping edge of the first unit overlying the lapping edge of the unit adjacently below, which is the unit immediately to the left of the unit which has the overlying cooperating corner joint. The units are laid right-handed, the portion 10 being placed over the portion 9. The additional reinforcement or pad 14 at the bottom of the lapping area formed by the portions 9 and 10 is necessitated by the addition of the tile end reinforcement. This pad 14 is wider than the cooperating overlying joint portion 22 formed upon the adjacently lower diagonal unit with which it cooperates. The co-operation of these parts to provide moisture-proof conditions for the several sections of the lapping area will be plainly apparent from an inspection of Figures 15, 16 and 17. The cutoff formation at the lower left-hand corner of the unit, indicated by the ordinal 30, provides a shoulder against which abuts the upper and inner edge of the pad 14 upon the unit portion adjacently above. The dotted line 49, Figure 5, indicates the normal thickness of the unit in a vertical direction and it will be noted that the beveled line 16 at the lower end of the unit forms an angle with this line 49 so that the increased thickness of the portion 14 at the extreme lower edge of the unit is all above the plane of the line 49, and gradually increases from no value whatever to the value indicated by the arrows 50, Figure 5.

The roof when completed then presents in plan appearance a succession of concave portions 41, 43, 45 and 47 alternated with a series of deeper trough sections 42, 44, 46 and 48, the side walls of the troughs 6, 7, 8 and 9 being inclined outwardly and upwardly, the over-lapping portions 9 and 10 at the opposed edges of adjacent units forming the outside wall of one of the troughs of each unit. It will be noted that the tiles are secured to the roof 23 and that the joints are made within the trough portions. It is desirable to keep as much water as possible out of these joint and attaching areas, so that the alternate concave portions 41, 43, 45 and 47 provide efficient means for drainage of all the water caught by these areas without danger of the same flowing over into the troughs 42, 44, 46 and 48.

Referring particularly to Figures 19, 20 and 21, there is shown the adaptation of my unit to flashing secured to an adjacent vertical wall, portions of the flashing being extended between the unit sections and beneath the same and adjacently over the felt 24. Flashing members which may be comprised of asphalt roofing sections 31 and 32 are bent in angle form adjacently against the vertical wall 34 and under the roofing units and between upper and lower units, respectively, as plainly shown in Figure 21, the spaces 25, 26 and 27 between the adjacently upper and lower unit ends formed by the thickened lower unit ends forming convenient and efficient means for fitting or placing the outer edges of the flashing member 32. Vertical cap flashing members 33, preferably made of tin, can then be secured by bent upper edge portions 33' to the grout 36 within the joints 35 between adjacent wall sections. Figures 19 and 20 illustrate in plan and in longitudinal section the appearance of the flashing formation shown in section in Figure 21.

In addition to the advantages hereinbefore specifically referred to and incidentally appearing in the description, I direct particular attention to the following additional advantages of my building tile. A saving in building construction is effected. The building foundations are less liable to settle, due to the light weight of the roof. There will be less breakage in shipping. The units nest closely together so as to make a good shipping package and there is a saving in cartage and freight. The concave upper portions of the unit provide parallel channels which give increased capacity for drainage of moisture, the concave channels adjacent the lateral joints between the tiles preventing spreading of water to that channel in which the joint is located. The channels also provide strength to resist deflection. The tiles are quite in harmony in appearance with frame building construction. In addition to these advantages, the construction of the tile itself is new, there being no other tile to my knowledge which is thicker at one end than at the other, except shingles which are tapered all the way. The construction of the particular joint is novel, and the construction provides resiliency, flexibility and possibility of adjustments at the free corners of the units.

What I claim is:

1. A roofing tile having opposite edge portions respectively downwardly inclined and upwardly inclined, a trough-like portion forming a joint member secured to said upwardly-inclined edge, the latter forming one side of said trough-like portion, a concave portion connected to said downwardly-inclined edge, and intermediate concave and trough-like portions connected to each other and to said two first-mentioned portions, respectively, said first-mentioned trough-like portion and the portion second removed therefrom being formed with tile-attaching means, the two other and alternate concave portions being shallower than said tile-attaching portions.

2. A roofing tile formed with a shouldered edge thicker than the body of the tile and with a thickened inwardly-extended joint member at one corner and with a complementary joint member of normal thickness at the diagonally-opposite corner.

3. A roofing tile formed with a shouldered edge thicker than the body of the tile and with a thickened inwardly-extended joint member at one corner which is beveled outwardly and upwardly and with a complementary joint member of normal thickness at the diagonally-opposite corner.

4. A roofing tile formed with a shouldered edge thicker than the body of the tile and with a thickened inwardly-extended joint member at one corner which is beveled outwardly and upwardly and with a complementary joint member of normal thickness at the diagonally-opposite corner, the last-mentioned joint member being narrower than the first-mentioned joint member.

5. A roofing tile comprising adjacent depressed portions extending longitudinally of the tile and having their respectively adjacent side walls directly joined together, one of said portions having a substantially flat bottom and another of said portions adjacent to the first mentioned portion being formed entirely above the plane of said bottom.

6. A roofing tile comprising trough-like portions and downwardly concave portions alternately connected together, the trough-like portions having substantially flat bottoms for attachment to a roof support and the concave portions being situated above the plane of the flat bottoms of the trough-like portions.

7. A roofing tile having a shouldered edge thicker than the body of the tile, a thickened inwardly-extended joint member at one of the lower corners, said joint member being beveled, and a complementary joint member of normal thickness at the diagonally-opposite corner.

8. A roofing tile having its lower edge thicker than the body of the tile and shouldered at its under surface, a thickened inwardly-extended joint member at one of the lower corners and a complementary joint member of normal thickness at the diagonally-opposite corner, the shoulder being cut away at that end of the lower edge spaced from said lower corner.

9. A roofing tile having its lower edge thicker than the body of the tile and shouldered at its under surface and having a thickened inwardly-extended beveled joint member at a corner corresponding to one end of said edge, the shoulder at the other end of said lower edge being cut away.

10. A roofing tile having an edge thicker than the body of the tile and shouldered at its under surface and having a thickened inwardly-extended joint member formed at a corner corresponding to one end of said edge, the shoulder at the other end of said edge being cut away.

11. A roof covering comprising roofing tiles laid in overlapping courses and overlapping vertical rows, the lower overlapping edges of the tiles being thickened, the joints between adjacent jointed upper and lower diagonal tiles each being formed by complementary beveled upper and lower edges of which the beveled edge of the upper tile is disposed beneath the complementary beveled edge of the lower tile, and the adjacent upper tiles overlapping said upper diagonal tiles having their thickened lower edges formed for overlapping of the beveled edges of said upper diagonal tiles.

12. A roof covering comprising roofing tiles laid in overlapping courses and overlapping vertical rows, the joints between adjacent jointed upper and lower diagonal tiles each being formed by complementary joint surfaces of which the joint surface of the upper tiles is disposed beneath the complementary joint surface of the lower tile, the joint surfaces of said upper diagonal tiles being wider than the joint surfaces of said lower diagonal tiles whereby portions of the joint surfaces of said upper diagonal tiles are free of the joint surfaces of said lower diagonal tiles, and the adjacent upper tiles overlapping said upper diagonal tiles having portions overlapping the free portions of the joint surfaces of said upper diagonal tiles.

13. A roofing tile having a thickened inwardly-extended joint member at one corner and a complementary joint member of normal thickness at the diagonally-opposite corner.

14. A roofing tile having a thickened inwardly-extending beveled joint member at a lower corner and a complementary joint member of normal thickness at the diagonally-opposite upper corner.

15. A roofing tile having its lower edge thicker than the body of the tile and shouldered at its under surface, an upwardly extending flange at one side edge, said flange having a thickened beveled joint portion at its lower end, and a downwardly extending overlapping flange at the other side edge, said overlapping flange having a joint portion at its upper end of normal thickness and complementary to said thickened beveled joint portion, and the lower edge shoulder being cut away at that end of the lower edge remote from said thickened beveled joint portion.

16. A roof covering comprising roofing tiles laid in overlapping courses and overlapping vertical rows, the lower overlapping edges of the tiles being thickened, thus raising the adjacent portions of the upper tiles above the respective tiles beneath to form flashing-receiving spaces, the lower right hand corner of each tile interlocking with the upper left hand corner of the diagonally disposed tile, these corner joints each being formed by an outside outwardly and upwardly beveled edge upon the upper tile and an inside outwardly and downwardly beveled edge upon the lower tile, said thickened edges of the upper courses of tiles being extended horizontally at one end of each tile and said thickened edges being also cut off at the opposite respective ends.

Signed by me this 27th day of December, 1927.

EDWIN A. MASTICK.